United States Patent [19]

Richter et al.

[11] Patent Number: 4,676,805

[45] Date of Patent: Jun. 30, 1987

[54] PROCESS FOR OPERATING A GAS GENERATOR

[75] Inventors: George N. Richter, San Marino; William L. Slater, La Habra, both of Calif.

[73] Assignee: Texaco Inc., White Plains, N.Y.

[21] Appl. No.: 707,719

[22] Filed: Mar. 4, 1985

Related U.S. Application Data

[63] Continuation of Ser. No. 499,610, May 31, 1983, abandoned.

[51] Int. Cl.$^4$ .................................................. C10J 3/46
[52] U.S. Cl. .................................... 48/197 R; 48/206; 48/215; 48/DIG. 10; 252/373
[58] Field of Search ...... 48/197 R, DIG. 10, DIG. 7, 48/202, 206, 215; 252/373

[56] References Cited

U.S. PATENT DOCUMENTS

| | | | |
|---|---|---|---|
| 4,017,272 | 4/1977 | Anwer et al. | 48/202 |
| 4,386,941 | 6/1983 | Crouch et al. | 48/197 R |
| 4,394,137 | 7/1983 | Marion et al. | 48/197 R |

*Primary Examiner*—Peter Kratz
*Attorney, Agent, or Firm*—Robert A. Kulason; Albert Brent

[57] ABSTRACT

A method is provided for turning down from design conditions or below the output of raw product gas from a free-flow partial oxidation gas generator, or when operating below design conditions the output of raw product gas from the gas generator may be turned up while maintaining substantially constant the efficiency of the gas generation, or conversion of the fuel to gas, and the quality of the gas produced. The flow rates of the feedstreams to the burner are adjusted down or up a predetermined amount for each of the feedstreams to the burner to obtain a specified output of raw product gas while maintaining substantially constant in the reaction zone the levels of O/C atomic ratio and the $H_2O$/fuel weight ratio. Further, a pressure adjustment in the system is made which produces a corresponding adjustment to the pressure in the gas generator. The adjusted pressure is a direct function of the adjusted flow rate for the adjusted fuel or oxidant feedstream.

11 Claims, No Drawings

PROCESS FOR OPERATING A GAS GENERATOR

This is a continuation, of application Ser. No. 499,610, filed May 31, 1983, now abandoned.

BACKGROUND OF THE INVENTION

This invention relates to the partial oxidation process. More specifically it relates to a method for turning up or down a free-flow partial oxidation gas generator for the production of synthesis gas, reducing gas, or fuel gas.

The manufacture of gaseous mixtures comprising $H_2$ and CO by the partial oxidation process is well known. Further, it is the preferred procedure for many fossil fuels, e.g. petroleum oil and coal. Synthesis gas made by this process is now widely used for the catalytic synthesis of such chemicals as ammonia, methanol and acetic acid. Coal gasification for the production of fuel gas which is burned in gas turbines for power generation is an acceptable alternative for nuclear energy and oil over the near term.

When the demand for feed gas to supply a chemical plant or an electrical generating station associated with a gas generating system decreases, the gas generator may have to operate at a fraction of the design feed rate so as to deliver a corresponding smaller amount of gas. When this occurs, performance of the system drops since the gas generator and related equipment are designed to operate at specific conditions such as pressure, residence time, velocities and pressure drops for the design output. It was unexpectedly found that by operating the partial oxidation gas generator in the manner specified herein, one can avoid the deleterious effects of the changes that would normally occur with a change in the flow rates of the feedstreams to the gasifier. High performance is thereby assured over a wide operating range.

SUMMARY OF THE INVENTION

This is an improved partial oxidation process for the production of synthesis gas, reducing gas, or fuel gas in which the rates of flow of the feedstreams to the gas generator are adjusted down or up by a specified percentage of the design flow rate, thereby turning down or up respectively, the output of the raw product gas. Although there is a change from the design flow rates, unexpectedly in the subject process system performance remains high.

In the process for a specified output of product gas, the flow rates for each of the feedstreams to the burner are adjusted down or up a predetermined amount e.g. to a value in the range of about 25 to 100% of the flow rate for which the system was designed while maintaining substantially constant the O/C atomic ratio and the $H_2O$/fuel weight ratio.

Further, the pressure in the system is also decreased or increased respectively, which produces a corresponding adjustment to the pressure in the gas generator. The adjusted pressure is a direct function of the adjusted flow rate for the fuel or oxidant feedstream optionally in admixture with a temperature moderator that is introduced into the gas generator. The adjusted pressure is in the range of about 50 to 100% of the design pressure.

All adjustments may be made manually or by computer control, simultaneously or with a specified relationship maintained between the variables.

DESCRIPTION OF THE INVENTION

The present invention pertains to an improved method for operating a noncatalytic partial oxidation gas generator for the production of synthesis gas, reducing gas, or fuel gas that is responsive to load changes by the consumer without imparing performance.

For example, this method may be used in the production of fuel gas for burning in a gas turbine driven electric generator, and in this use it can provide automatic load following of the gasification plant in response to the electric power generation demand.

In the process, a hot effluent gas stream is made by the partial oxidation of a fuel feedstream comprising a liquid or gaseous hydrocarbonaceous fuels optionally in admixture with a temperature moderator. The hydrocarbonaceous fuel may also comprise oxygen-containing hydrocarboneous fuels and pumpable slurries of solid carbonaceous fuels in a liquid carrier. The oxidant feedstream comprises a free-oxygen containing gas optionally in admixture with a temperature moderator. A separate feedstream of temperature moderator may be optionally present.

The feedstreams are passed through feed lines connected to a burner located in the top of the gas generator. Conventional flow rate controls including a flow rate transmitter, flow recorder-controller or a system control means and a flow rate regulator, such as a valve, may be included in the feed lines for gaseous hydrocarbonaceous fuels. The flow rate for liquid hydrocarbonaceous fuels and slurries of solid carbonaceous fuels may be controlled by a flow rate transmitter, flow recorder-controller or a system control means, and a positive displacement pump equipped with a speed control. In one embodiment, the signals from the flow rate transmitters are provided to a computerized system control means which automatically determines the necessary flow rate adjustments to provide the demand flow rate for the cooled and scrubbed product gas, and provides a corresponding adjustment signal to an automatic control valve in each feed line or to a alternate speed control for the positive displacement pump for liquid fuels and slurries of solid carbonaceous fuel.

The gas generator is a vertical cylindrical steel pressure vessel lined on the inside with a thermal refractory material. A typical partial oxidation synthesis gas generator is shown in co-assigned U.S. Pat. Nos. 2,818,326 and 3,544,291 which are incorporated herein by reference. The raw product gas with entrained soot, slag, or other particulate matter passes through an outlet throat in the bottom of the gas generator before entering a gas cooling and scrubbing zone. A burner is located in the top of the gas generator along the central vertical axis for introducing the feed streams. A suitable annulus-type burner is shown in co-assigned U.S. Pat. No. 2,928,460.

The term hydrocarbonaceous fuel as used herein, is intended to include various liquid hydrocarbon materials, such as liquefied petroleum gas, petroleum distillates and residues, gasoline, naphtha, kerosene, crude petroleum, asphalt, gas oil, residual oil, tar-sand oil, shale oil, oil derived from coal, aromatic hydrocarbons (such as benzene, toluene, and xylene fractions), coal tar, cycle gas oil from fluid-catalytic-cracking operations, furfural extract of coker gas oil, and mixtures thereof. Included within the definition of liquid hydrocarbonaceous fuel are oxygenated hydrocarboneous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The term gaseous hydrocarbonaceous fuel, as used herein, includes by definition methane, ethane, propane, butane, pentane, natural gas, water gas, coke-oven gas, refinery gas, synthesis gas, acetylene tail gas, ethylene off-gas and mixtures thereof.

Also included within the definition of liquid hydrocarbonaceous fuel are pumpable slurries of solid carbonaceous fuels. Pumpable slurries of solid carbonaceous fuels may have a solids content in the range of about 25-80 wt. %, such as 45-75 wt. %, depending on the characteristics of the fuel and the slurrying medium. The slurrying medium may be water, liquid hydrocarbonaceous fuel, or both.

The term solid carbonaceous fuel includes coal, such as anthracite, bituminous, subbituminous; coke from coal; lignite; residue derived from coal liquefaction; oil shale; tar sands; petroleum coke; asphalt; pitch; particulate carbon (soot); concentrated sewer sludge; and mixtures thereof. The solid carbonaceous fuel may be ground to a particulate size so that 100% passes through an ASTM E11-70 Sieve Designation Standard (SDS) 1.4 mm Alternative No. 14, or finer.

The use of a temperature moderator in the reaction zone of the gas generator depends in general on the carbon to hydrogen ratio of the feed stock and the oxygen content of the oxidant stream. Suitable temperature moderators include steam, water, $CO_2$-rich gas, liquid $CO_2$, cooled effluent gas from the gas generator, by-product nitrogen from the air separation unit used to produce substantially pure oxygen, and mixtures of the aforesaid temperature moderators. The temperature moderator may be introduced into the gas generator in admixture with either the liquid hydrocarbonaceous fuel feed, the free-oxygen containing stream, or both. Alternatively, the temperature moderator may be introduced into the reaction zone of the gas generator by way of a separate conduit leading to the fuel burner. When $H_2O$ is introduced into the gas generator either as a temperature moderator, a slurrying medium, or both, the weight ratio of $H_2O$ to the liquid or gaseous hydrocarbonaceous fuel or solid carbonaceous fuel is in the range of about 0.2 to 5.0 and preferably in the range of about 0.3 to 1.0.

The term free-oxygen containing gas, as used herein is intended to include air, oxygen-enriched air, i.e., greater than 21 mole % oxygen, and substantially pure oxygen, i.e., greater than 95 mole % oxygen, (the remainder comprising $N_2$ and rare gases). Free-oxygen containing gas may be introduced into the burner at a temperature in the range of about ambient to 1200° F. The atomic ratio of free-oxygen in the oxidant to carbon in the feed stock (O/C, atom/atom) is preferably in the range of about 0.7 to 1.5, such as about 0.80 to 1.3.

The relative proportions of hydrocarbonaceous fuel or solid carbonaceous fuel, water or other temperature moderator, and oxygen in the feed streams to the gas generator are carefully regulated to convert a substantial portion of the carbon in the fuel fed to the partial oxidation gas generator, e.g. about 70 to 100 wt. %, such as about 90 to 99 wt. %, of the carbon to carbon oxides e.g., CO and $CO_2$, and to maintain an autogenous reaction zone temperature in the range of about 1700° to 3000° F., such as about 2350° to 2900° F. The pressure in the reaction zone is in the range of about 5 to 250 atmospheres, such as about 10 to 200 atmospheres. The time in the reaction zone of the partial oxidation gas generator in seconds is in the range of about 0.5 to 20, such as normally about 1.0 to 5.

The effluent gas stream leaving the partial oxidation gas generator has the following composition in mole % depending on the amount and composition of the feedstreams: $H_2$ 8.0 to 60.0, CO 8.0 to 70.0, $CO_2$ 1.0 to 50.0, $H_2O$ 2.0 to 50.0, $CH_4$ 0.0 to 30.0, $H_2S$ 0.0 to 2.0, COS 0.0 to 1.0, $N_2$ 0.0 to 80.0, and A 0.0 to 2.0. Entrained in the effluent gas stream is about 0.5 to 30 wt. %, such as about 1 to 10 wt. % of particulate carbon (basis weight of carbon in the feed to the gas generator).

The effluent gas stream leaving the reaction zone of the noncatalytic partial oxidation gas generator at a temperature in the range of about 1700° F. to 3000° F. may be either (1) quench cooled and scrubbed with water, (2) cooled in a gas cooler and then scrubbed with water, or both (1) and (2). Gaseous impurities may be optionally removed by conventional gas purification procedures. The product gas stream may be used as synthesis gas, reducing gas, or fuel gas depending upon its composition.

In the operation of the subject process, a change in demand for example in the chemical being synthesized in a chemical plant, or for the metal being produced in a reducing furnace, or in the demand for power being generated causes a corresponding change in demand to the associated gasification unit for product synthesis gas, reducing gas, or fuel gas, respectively. If the demand is for a reduced rate of product gas, the flow rate for each of the feedstreams to the burner is adjusted down in order to turn down the output of raw product gas from the gas generator operating at design output or below at the time of the adjustment. Alternatively, if the demand is for an increased rate of product gas, the flow rate for each of the feedstreams to the burner is adjusted up in order to turn up the output of raw product gas from a gas generator operating below design output at the time of the ajustment. The adjusted flow rates are predetermined so that a specified output of raw product gas is obtained from the gas generator while the O/C atomic ratio and the $H_2O$/fuel weight ratio in the reaction zone are maintained substantially constant.

The adjusted flow rate for each of the adjusted feedstreams is in the range of about 25 to 100% of the design flow rate for that stream. Flow rate adjustments may be made manually or by computer. The flow rate adjustments for all of the streams may be made simultaneously. However, in one embodiment the flows are adjusted so as to maintain the O/C atomic ratio during the changes up to 0.05 lower than during steady state operations. In the case of turn down the reduction in the flow rate of the free-oxygen containing gas stream optionally in admixture with a temperature moderator is begun before the reduction of the flow rate of the fuel stream optionally in admixture with temperature moderator and the temperature moderator stream, if any. By appropriate selection of the time interval between the beginnings of the two adjustments and the relative rates, the O/C atomic ratio is allowed to decrease by up to 0.05 during the transient period as compared to the substantially constant value maintained during steady state. Conversely, in turn up the increase in the flow rates of the fuel stream optionally in admixture with temperature moderator and any temperature moderator stream is begun before the increase in the flow rate of the stream of free-oxygen containing gas optionally in admixture with a temperature moderator and the increases are made in such a fashion that the O/C atomic ratio is allowed to decrease by up to 0.05 during the transient—as was specified for the turn down case.

When the fuel feedstream to the partial oxidation gas generator comprises a gaseous hydrocarbonaceous fuel optionally in admixture with temperature moderator, the flow rate adjustments may be made by manual or computer operated valving means. With feedstreams comprising a liquid hydrocarbonaceous fuel optionally in admixture with temperature moderator or a slurry of solid carbonaceous fuel, flow rate adjustment may be made by a manual or computer operated speed control that is associated with a positive displacement pump.

The pressure in the system is also adjusted in the subject process. Preferably, the pressure adjustment is made after all of the flow rate adjustments are completed and the system is stabilized. However, when there is substantially no delay between adjustments, the pressure and all of the flow rate adjustments may be made simultaneously. By adjusting the system pressure down or up to a value which is a direct function of the adjusted flow rate for the fuel or oxidant feedstreams, it was unexpectedly found that there is substantially no change in the performance of the gasifier as indicated by such measurements as the extent of carbon conversion to gas and the consumptions of oxygen and fuel. Ordinarily, a reduction in flow rate for the feedstreams to the burner would result in a loss of operating efficiency.

In the turn up embodiment wherein the flow rates for the feedstream to the burner are increased to predetermined levels the pressure in the gas generator is increased to a predetermined value.

The pressure in the system is substantially equal to the pressure in the reaction zone of the gas generator less ordinary pressure drop in the lines, fittings, and equipment. The pressure adjustment may be made by manual or automatic e.g. computer operated valving means located downstream from the gas generator. For example, a back-pressure valve may be installed downstream from the gas generator after the gas stream has been cooled and scrubbed. Thus, the back-pressure valve may be installed in the product gas line exiting a gas scrubber that follows a waste-heat boiler, or the gas quench tank and/or scrubber, or a gas purification unit, if any that may follow a gas scrubber. A pressure tranducer may be located in a cooled and scrubbed product gas line or pressure vessel in that line located upstream from the back-pressure valve. The pressure in the gas generator will be equal to the pressure at the point of measurement plus the total pressure drop in the lines, fittings, and equipment located between the reaction zone and the pressure transducer.

The advantage of maintaining high system performance was unexpectedly found by adjusting the pressure in a partial oxidation gas generator as a direct function of the adjusted flow rate for the fuel or oxidant feedstreams (optionally in admixture with a temperature moderator) to the burner in accordance with the subject invention.

In one embodiment the pressure in the gas generator is adjusted in accordance with Equation I as follows:

$$P = 19 + 1.36 X - 0.0048 X^2 \qquad \text{I}$$

wherein: P is the adjusted pressure in the gas generator expressed as a percent of the design pressure.

X is the adjusted flow rate for the fuel feedstream optionally in admixture with a temperature moderator and is expressed as a percent of the design flow rate. X in Equation I is in the range of not less than 25 and less than 85. When X is not less than 85, P is equal to 100.

One embodiment of the invention relates to a computerized control system for controlling the operation of a partial oxidation gas generator. In this system a change in product gas demand by a user located downstream from the gas generator will provide a signal to a system computer control means which also receives input signals corresponding to the flow rates for each of the feedstreams to the gas generator. The system control means then determines the amount of adjustment to the flow rate for each of the feedstreams to the burner in order to produce product gas at the new demand rate while maintaining the oxygen/carbon atomic ratio and the $H_2O$/fuel weight ratio in the reaction zone substantially constant. Responsive to said flow rate determinations, a corresponding adjustment signal is provided by the system control means to each flow control unit in each feedline to the burner.

Further, a pressure transducer located in the cooled and scrubbed product gas located downstream from the gas generator also provides a signal to the system control means which is representative of the cooled and scrubbed product gas pressure. The system control means then automatically computes the amount of adjustment that is required in order to bring the adjusted pressure in the gas generator to a value which is a direct function of the adjusted flow rate for the fuel or oxidant feedstreams to the burner. Responsive to said determination, a corresponding adjustment signal is provided by said system control means to a pressure control valve located in the cooled and scrubbed product gas line and the necessary adjustment is made.

EXAMPLE

The following example illustrates a preferred embodiment of the process of this invention and should not be construed as limiting the scope of the invention. Run No. 1 describes the operation of the gas generator under design conditions. In Run No. 2, the flow rates for the feedstreams are reduced to 54% of design with no change in pressure in the gas generator. In Run No. 3, the flow rates are reduced to 50% of design and in addition the pressure in the gas generator is reduced. Run No. 3 illustrates the subject invention. Runs Nos. 1 and 2 are included for comparative purposes only.

RUN NO. 1

A partial oxidation gas generating system is designed to produce 1.034 million standard cubic feed (SCF measured at 60° F., 14 psig) of fuel gas per hour. The fuel gas is burned in a gas turbine that powers an electric generator. The fuel to the gas generator comprises 20620 lbs per hour of a pumpable dispersion comprising a vacuum resid having a gravity of 8.9 degrees API and an Ultimate Analysis in weight percent as follows: C 87.47, H 10.21, N 0.62, S 1.60 and O 0.10, an ash content of 0.03 weight % max., and 381 lbs per hour of unreacted particulate carbon. The pumpable dispersion at temperature of 390° F. is mixed with 9,920 lbs. per hour of steam at a temperature of 888° F.

The oil-carbon-steam feed mixture is passed through a feed line connected to a burner located in the upper central inlet of a refractory lined noncatalytic free-flow partial oxidation gas generator. Simultaneously, a stream of 22,100 lbs. per hour of substantially pure oxygen i.e. 99.8 mole % $O_2$ is passed through a separate feedline connected to the burner. A mixture of the two feed streams is discharged at the tip of the burner and are reacted in the reaction zone of the gas generator at a temperature 2580° F., a pressure of 600 psig., an O/C atomic ratio of 0.92 and a $H_2O$/fuel weight ratio of 0.48. A stream of hot raw fuel gas leaves the reaction zone through an outlet throat located at the bottom of the reaction zone along its central longitudinal axis. The gas composition in mole % (dry basis) follows: $H_2$ 45.49, CO 49.19, $CO_2$ 4.65, N+A 0.22, $CH_4$ 0.08, $H_2S$ 0.35 and COS 0.02. About 385 lbs. per hour of unreacted carbon plus ash are entrained in the raw synthesis gas. The hot raw gas stream is quench cooled with water. After cooling, the gas stream is scrubbed with water in a conventional gas scrubber to produce a product stream of cooled and clean fuel gas.

rate of $H_2+CO$ produced is 50% of the design rate in Run No. 1.

TABLE I

| | GAS GENERATOR OPERATION | | | | | GASIFICATION PERFORMANCE | | |
|---|---|---|---|---|---|---|---|---|
| Run No. | Feed Flow Rate % of Design | Pressure % of Design | O/C Atomic Ratio | $H_2O$/Fuel Wt. Ratio | Product Gas $H_2$ + CO Rate % of Design | Carbon Conversion to $H_2$ + CO Wt. % | SOC SCF $O_2$/MSCF $H_2$ + CO | CGE % |
| 1 | 100 | 100 | .92 | .48 | 100 | 98 | 265 | 83 |
| 2 | 54 | 100 | .97 | .48 | 50 | 92 | 290 | 77 |
| *3 | 50 | 75 | .92 | .48 | 50 | 98 | 265 | 83 |

*Only Run No. 3 represents the subject process. Run No.'s 1 and 2 are included for comparison purposes.

RUN NO. 2

In Run No. 2, the system described in Run No. 1, is turned down to reduce the output of $H_2+CO$ in the product gas by 50%. The rates of flow of all of the feedstreams to the burner are reduced to 54% of the design flow rates to produce this quantity of product. The pressure in the gas generator and the $H_2O$/fuel wt. ratio remain the same as that for Run No. 1.

RUN NO. 3

In Run No. 3, the system described in Run No. 1 is turned down to reduce the output of $H_2+CO$ in the product gas by 50% and the pressure in the gas generator is reduced to 450 psig, which is about 75% of the design pressure.

A comparison of the gasification performance efficiency for Runs 1 to 3 is shown in Table I, which follows. The performance efficiency for the three runs is represented by the extent of carbon conversion to gaseous products, Specific Oxygen Consumption, SOC, (SCF of Oxygen Consumed/MSCF of $H_2+CO$ produced) and Cold Gas Efficiency, CGE, 100 times the Higher Heating Value for the $H_2+CO$ produced/Higher Heating Value for the hydrocarbonaceous fuel fed to gasifier).

The improvements of the subject process are readily discernable from the data shown in Table I for the various runs. For example, in Run No. 2 where the pressure in the gas generator is the same as that in Run No. 1, gasification performance has fallen off with a reduction in the rate of $H_2+CO$ produced. The extent of carbon conversion to gaseous products and the cold gas efficiency in Run No. 2 are reduced while the specific oxygen consumption is increased in comparison with the performance of Run No. 1. In contrast, in Run No. 3 by dropping the pressure in the gas generator to about 75% of the design pressure of Run No. 1, there is no change in gasification performance even though the The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

We claim:

1. In a partial oxidation process for the production of a raw effluent stream of synthesis gas, reducing gas or fuel gas in a free-flow partial oxidation gas generator wherein a plurality of feedstream comprising a liquid hydrocarbonaceous fuel optionally in admixture with a temperature moderator, or a slurry of solid carbonaceous fuel, an oxidant stream comprising a free-oxygen containing gas optionally in admixture with a temperature moderator, and with or without a separate stream of temperature moderator are passed through feed lines provided with flow control means and then through a burner which discharges into the reaction zone of said gas generator wherein partial oxidation of said fuel takes place at a temperature in the range of about 1700° F. to 3000° F. and a pressure in the range of about 5 to 250 atmospheres; and wherein a stream of hot raw product gas passes down through an outlet throat at the bottom of the reaction zone and is cooled in a gas coolng zone, and soot and/or other matter entrained in the raw gas stream are removed in a scrubbing zone, to produce a stream of cooled and cleaned product gas, the improvement for turning down or up the flow rates for the separate feedstreams to the burner a predetermined amount to obtain a specified output of said raw effluent gas stream comprising:

(1) adjusting the flow rate down at turn-down or up at turn-up a predetermined amount to a value in the range of about 25 to 100% of the flow rate for which the process was designed for each of the feedstreams to the burner to obtain a decreased output of raw effluent gas at turn-down or an increased output of raw effluent gas at turn-up while maintaining the O/C atomic ratio and the $H_2O$/fuel weight ratio in the reaction zone substantially constant or optionally decreased up to 0.05 during the transient period; wherein said flow rate adjusting sequences for turn-down or turn-up comprises sequentially reducing the flow rate for said feedstreams at turn-down, or alternatively sequentially increasing the flow rates for said feedstreams at turn-up; and where in the turn-down adjusting sequence the flow rate for the free-oxygen containing gas stream with or without admixture with a temperature moderator is reduced first followed by the reduction of the flow rate for the fuel stream, optionally in admixture with a temperature moderator, and reduction of the flow rates for the temperature moderator stream, if any; and where in the turn-up adjusting sequence the flow rate of the fuel steam, optionally in admixture with a temperature moderator, and the flow rate for the temperature moderator steam, if any, are increased first followed by the increase of the flow rate of the free-oxygen containing gas with or without admixture with a temperature moderator; and after or simultaneously with said flow rate adjustments (2) adjusting the pressure down at turn-down or up at turn-up in the gas generator to a predetermined value in the range of about 50 to 100% of the pressure for which the process was designed, said predetermined value being a direct function of the adjusted flow rate for the fuel or oxidant feedstream adjusted in (1) and which is within the pressure range of about 5 to 250 atmospheres; and wherein said pressure adjustment is made with a manually or automatically operated pressure control valve located downstream from the gas generator after the gas stream has been cooled and wherein said flow rate adjustment is accomplished without loss of process efficiency as a result of said pressure adjustment.

2. The process of claim 1 wherein the fuel feedstream in (1) comprises a liquid hydrocarbonaceous fuel optionally in admixture with a temperature moderator or a slurry of solid carbonaceous fuel whose flow rate adjustment in (1) is done with a manually or automatically operated speed control for a pump.

3. The process of claim 1 in which said hydrocarbonaceous fuel is a liquid hydrocarbon selected from the group consisting of liquefied petroleum gas, petroleum distillates and residua, gasoline, naphtha, kerosene, crude petroleum, asphalt, gas oil, residual oil, tar-sand oil and shale oil, oil derived from coal, aromatic hydrocarbons (such as benzene, toluene, xylene fractions), coal tar, cycle gas oil from fluid-catalytic-cracking operations, furfural extract of coker gas oil, and mixtures thereof.

4. The process of claim 1 in which said slurry of a solid carbonaceous fuel employs a liquid carrier from the group consisting of water, liquid hydrocarbon fuel, and mixtures thereof.

5. The process of claim 4 in which said solid carbonaceous fuel is selected from the group consisting of coal such as anthracite, bituminous, subbituminous; coke from coal; lignite; residue derived from coal liquefaction; oil shale; tar sands; petroleum coke; asphalt; pitch; particulate carbon (soot); concentrated sewer sludge; and mixtures thereof.

6. The process of claim 1 in which said hydrocarbonaceous fuel is an oxygenated hydrocarbonaceous organic material from the group consisting of carbohydrates, cellulosic materials, aldehydes, organic acids, alcohols, ketones, oxygenated fuel oil, waste liquids and by-products from chemical process containing oxygenated hydrocarbonaceous organic materials, and mixtures thereof.

7. The process of claim 1 in which said temperature moderator is selected from the group consisting of steam, water, $CO_2$-rich gas, liquid $CO_2$, $N_2$, cooled effluent gas from the gas generator, and mixtures thereof.

8. The process of claim 1 in which said free-oxygen containing gas is selected from the group consisting of air, oxygen-enriched-air i.e. greater than 21 mole % $O_2$, and substantially pure oxygen, i.e. greater than about 95 mole % oxygen.

9. In a partial oxidation process for the production of synthesis gas, reducing gas or fuel gas in a free-flow partial oxidation gas generator wherein a plurality of feedstreams comprising a liquid hydrocarbonaceous fuel optionally in admixture with a temperature moderator, or a slurry of solid carbonaceous fuel, an oxidant stream comprising a free-oxygen containing gas optionally in admixture with a temperature moderator, and with or without a separate stream of temperature moderator are passed through feed lines provided with flow control means and then through a burner which discharges into the reaction zone of a free-flow noncatalytic gas generator where partial oxidation of said fuel takes place at a temperature in the range of about 1700° F. to 3000° F. and a pressure in the range of about 5 to 250 atmospheres and wherein a stream of hot raw product gas passes down through an outlet throat at the bottom of the reaction zone and is cooled in a gas cooling zone, and soot and/or other matter entrained in the raw gas stream are removed in a scrubbing zone to produce a stream of cooled and scrubbed product gas, the improvement for turning down or up the flow rates for the separate feedstreams to the burner a predetermined amount to obtain a specified output of said raw effluent gas stream comprising:

(1) adjusting the flow rate down at turn-down or up at turn-up a predetermined amount to a value in the range of about 25 to 100% of the flow rate for which the process was designed for each of the feedstreams to the burner to obtain a decreased output of raw effluent gas at turn-down or an increased output of raw effluent gas at turn-up while maintaining the O/C atomic ratio and the $H_2O$/fuel weight ratio in the reaction zone substantially constant or optionally decreased up to 0.05 during the transient period; and after or simultaneously with the adjustments of said flow rates (2) adjusting the pressure down at turn-down or up at turn-up in the gas generator to a predetermined value in the range of about 50 to 100% of the pressure for which the process was designed, said predetermined value being determined in accordance with the following equation:

$$P = 19 + 1.36\, X - 0.0048\, X^2$$

Where:
P is the adjusted pressure in the gas generator expressed as a percent of the pressure for which the process was designed;
X is the adjusted flow rate for the fuel feedstream optionally in admixture with a temperature moderator and is expressed as a percent of the fuel flow rate for which the process was designed; and wherein said pressure adjustment is made with a manually or automatically operated pressure control valve located downstream from the gas generator after the gas stream has been cooled.

10. The process of claim 9 in which said hydrocarbonceous fuel is a pumpable slurry of solid carbonaceous fuel in a liquid carrier from the group consisting of water, liquid hydrocarbon fuel, and mixtures thereof; and said solid carbonaceous fuel is selected from the group consisting of coal such as anthracite, bituminous, subbituminous; coke from coal; lignite; residue derived from coal liquefaction; oil shale; tar sands; petroleum coke; asphalt; pitch; particulate carbon (soot); concentrated sewer sludge; and mixtures thereof.

11. The system of claim 9 in which said hydrocarbonaceous fuel is an oxygenated hydrocarbonaceous organic material from the group consisting of carbohydrates, cellulosic materials, aldehydes, organic acids, alcohols, ketones, oxygenated fuel oil, waste liquids and by-products from chemical process containing oxygenated hydrocarbonaceous organic materials, and mixtures thereof.

* * * * *